United States Patent [19]

Breault et al.

[11] Patent Number: 5,366,825
[45] Date of Patent: Nov. 22, 1994

[54] LAMINATED ELECTROLYTE RESERVOIR PLATE

[75] Inventors: Richard D. Breault, Coventry; Michael E. Gorman, Glastonbury, both of Conn.

[73] Assignee: International Fuel Cells Corporation, South Windsor, Conn.

[21] Appl. No.: 178,074

[22] Filed: Jan. 6, 1994

Related U.S. Application Data

[62] Division of Ser. No. 40,955, Mar. 31, 1993, Pat. No. 5,300,124.

[51] Int. Cl.$^5$ ............................................. H01M 2/18
[52] U.S. Cl. .................................... 429/34; 429/41
[58] Field of Search .................. 429/34, 38, 41, 44, 429/143, 142

[56] References Cited

U.S. PATENT DOCUMENTS

| | | | |
|---|---|---|---|
| 4,185,145 | 1/1980 | Breault | 429/34 |
| 4,276,356 | 6/1981 | Baker | 429/41 |
| 4,352,865 | 10/1982 | DiPasquale | 429/41 |

*Primary Examiner*—Anthony Skapars
*Attorney, Agent, or Firm*—Pamela J. Curbelo

[57] ABSTRACT

An electrolyte reservoir plate is formed in a papermaking process. Graphite powder, reinforcing fibers, cellulosic fibers, and a thermosetting resin are mixed with a liquid to form a slurry and showered onto a screen to form a planar sheet which is dried to form paper. The paper is cut into the desired size and is lay-up with main sheets 4 and edge strips 6. The lay-up is laminated with pressure and heat, carbonized, and graphitized to form an electrolyte reservoir plate.

9 Claims, 1 Drawing Sheet

LAMINATED ELECTROLYTE RESERVOIR PLATE

This is a division of copending application Ser. No. 8/040,955 filed on Mar. 31, 1993, now U.S. Pat. No. 5,300,124.

TECHNICAL FIELD

The present invention relates to electrolyte reservoir plates, and especially relates to laminated electrolyte reservoir plates.

BACKGROUND OF THE INVENTION

Fuel cells, particularly acid fuel cells, are comprised of an anode chamber, an anode electrode on a substrate, an electrolyte matrix, a cathode electrode on a substrate, a cathode chamber, an electrolyte reservoir plate, and a separator plate. These components are aligned electrically in series such that a stack of fuel cells can be employed in the production of electricity.

The electrolyte reservoir plate is a porous structure filled with electrolyte. During fuel cell operation, the electrolyte reservoir plate supplies electrolyte to the fuel cell to replenish electrolyte which has been lost by evaporation therefrom. Due to the constraints of the electrolyte reservoir plate formation process, these plates are costly to manufacture and possess limited strength.

For example, electrolyte reservoir plates can be formed in a dry-laid process where graphite powder, powdered phenolic resin, and fibers are showered onto a slow-moving belt to form a layer. The layer enters an oven where it is compacted with a second belt to form a 0.150 inch thick layer which is heated until the phenolic resin melts and coats the graphite powder and fibers. The resin is then cured, thereby bonding the graphite powder and fibers in a composite. Although this is a common electrolyte reservoir plate formation process, the forming speed is slow and it is difficult to incorporate relatively long fibers which are necessary for electrolyte reservoir plate structural integrity. Longer fibers tend to become entangled in the dry-laid feeder, thereby forming fiber bundles in the finished composite. This fiber bundling, which corresponds to uneven fiber distribution, creates weak areas within the composite which are susceptible to structural failure. Composite structural integrity is maximized at fiber lengths greater than about 1.0 mm (about 0.040 inches) while the dry-laid process is limited to fiber lengths of about 0.51 mm (about 0.02 inches).

An additional disadvantage of the dry-laid process is the post formation impregnation of two parallel edges of the composite with a substance such as hydrophilic ink to form a gaseous edge seal when filled with electrolyte. This prevents a possible mixing of fuel and oxidant utilized in the fuel cell. The impregnation, however, becomes increasingly difficult if the electrolyte reservoir plate thickness increases above about 0.10 inches, if the density increases to about 1.0 g/cc or greater, if the median pore diameter decreases to below about 20 microns, and/or if any of these parameters are not substantially uniform throughout the composite. Consequently, the tolerances in the specification for the electrolyte reservoir plate are small and the fabrication is difficult, resulting in many rejected parts.

What is needed in the art is an improved electrolyte reservoir plate which is more efficient to process, and has improved structural integrity and gas edge barriers.

DISCLOSURE OF THE INVENTION

The invention relates to a laminated electrolyte reservoir plate and a method for making the same. The electrolyte reservoir plate comprises a mixture of graphite powder, reinforcing fibers, cellulosic fibers, and thermosetting resin, which has been formed into a planar sheet. This planar sheet has been cut into a plurality of main sheets and a plurality of edge strips which have been laid-up, such that said edge strips are located along the perimeter of said main sheets along said opposing edges, laminated together, carbonized, and graphitized.

The method for forming the laminated electrolyte reservoir plate comprises mixing the graphite powder, reinforcing fibers, cellulosic fibers, and thermoserring resin with a liquid to form a slurry which is formed into a planar sheet. The liquid is then removed from the planar sheet and the sheet is cut into a plurality of main sheets and a plurality of edge strips. The main sheets and edge strips are laid-up, such that said edges strips are located along the perimeter of said main sheets adjacent to said opposing edges, laminated, carbonized, and graphitized to form the electrolyte reservoir plate.

An alternative method for forming the laminated electrolyte reservoir plate, comprises mixing the graphite powder, reinforcing fibers, and cellulosic fibers, with a liquid to form a slurry which is formed into a planar sheet. The liquid is removed from the planar sheet to form a dried sheet which is impregnated with thermosetting resin. The impregnated sheet is cut into a plurality of main sheets and a plurality of edge strips which are laid-up, such that said edges strips are located along the perimeter of said main sheets adjacent to said opposing edges, laminated, carbonized, and graphitized to form the electrolyte reservoir plate.

The foregoing and other features and advantages of the present invention will become more apparent from the following description and accompanying drawings.

Figure 1:
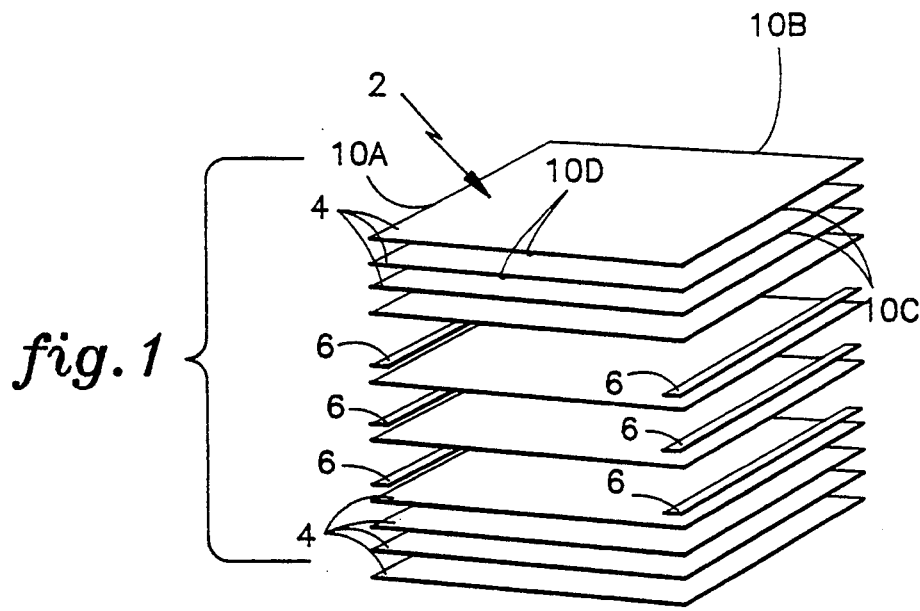
FIG. 1 is an exploded perspective view of the lay-up for the laminated electrolyte reservoir plate of the present invention.

The figures are meant to further illustrate the invention and not to limit the scope thereof.

BEST MODE FOR CARRYING OUT THE INVENTION

The present invention is directed toward a laminated electrolyte reservoir plate comprising graphite powder, cellulosic fibers, and reinforcing fibers all bonded together with a thermosetting resin. This electrolyte reservoir plate is formed in a papermaking process where the cellulosic fibers provide sufficient wet-strength in the fabrication process such that the paper, in the form of a wet, flat sheet, possesses sufficient tensile strength to traverse the entire papermaking machine without breaking. In contrast, the reinforcing fibers provide structural integrity to the finished electrolyte reservoir plate. The graphite powder provides increased thermal and electrical conductivity in the finished electrolyte reservoir plate as well as principally influencing the median pore diameter thereof, while the thermosetting resin binds the fibers and graphite powder together by forming a continuous phase throughout the electrolyte reservoir plate after lamination and provides an electrical and thermal bridge between the individual graphite particles for enhanced electrical and thermal conductivity after graphitization.

The graphite powder typically has a median particle size which compliments the median pore size of the adjacent electrode substrate based upon capillary forces. If the electrolyte reservoir plate possesses a median pore size smaller than the electrode substrate, the electrolyte reservoir plate will always retain the majority of the cell electrolyte in preference to the electrode substrate, while continuously replenishing electrolyte to the electrode substrate, edge seals, and electrolyte matrix which has evaporated from the cell. Therefore, since the electrode substrate has a median pore size of about 25 $\mu$ to about 35 $\mu$, an electrolyte reservoir plate median pore size of about 10 $\mu$ to about 20 $\mu$ will attain optimum electrolyte sharing between the electrolyte reservoir plate and the adjacent electrode substrate. Consequently, the median particle size of the graphite powder is typically about 2 microns ($\mu$) to about 300 $\mu$, with a median particle size of about 40 $\mu$ to about 150 $\mu$ preferred to attain a median pore size of about 10 $\mu$ to about 20 $\mu$. These particle sizes are additionally chosen so that the electrolyte reservoir plate does not wick electrolyte from the matrix layer or edge seals of the cell which require nearly 100% electrolyte fill to prevent fuel and/or oxidant mixing.

The concentration of graphite powder in the final electrolyte reservoir plate is typically about 25 weight percent (wt %) to about 60 wt %, with about 35 wt % to about 50 wt % graphite powder preferred. Possible graphite powders include: AIRCO ® 60 Graphite Powder produced by Carbide/Graphite Group, Inc., of St. Marys, Pa.; Asbury 4234 Graphite Powder produced by Asbury Graphite Mills, Inc., Asbury, N.J.; and Dixon 200-42 Graphite Powder produced by Dixon Ticonderoga, Lakehurst, N.J.; mixtures thereof; and other conventional graphite powders.

The graphite powder is combined with reinforcing fibers which impart structural integrity to the final electrolyte reservoir plate. The ultimate strength of the electrolyte reservoir plate is governed by the amount of bonded reinforcing carbon fiber surface area. If the reinforcing fiber diameter is significantly increased to over about 15$\mu$, less surface area per unit weight of fiber is available for bonding during the thermoset process (discussed below). However, if the reinforcing fiber diameter is significantly below about 5 $\mu$, excessive amounts of thermosetting resin are required to bond the electrolyte reservoir plate together. Consequently, these fibers typically have a diameter less than about 15 $\mu$, with a fiber diameter of about 5 $\mu$ to about 10 $\mu$ preferred.

The reinforcing fiber also preferably has a tensile modulus above about 20 MMpsi. When the tensile modulus of the reinforcing fibers falls below about 20 MMpsi, the flexural strength of the composite is no longer governed by the bonded surface area of the reinforcing fiber but by its tensile strength, and the structural integrity of the electrolyte reservoir plate is reduced to a flexural strength below about 1000 psi. Consequently, fibers possessing a tensile modulus in excess of about 20 MMpsi can be employed, with fibers possessing a tensile modulus equal to or in excess of about 30 MMpsi preferred.

In addition to fiber diameter and tensile modulus, the fiber length effects the ability of the reinforcing fibers to impart structural integrity to the electrolyte reservoir plate. Fiber lengths in excess of about 0.04 inches are preferred, with a length of about 0.10 inches to about 0.25 inches especially preferred. For a horizontal wire papermaking machine, for example, fiber lengths exceeding about 0.25 inches are typically undesirable because they diminish the uniformity of the planar sheets due to fiber bundling. Note, longer fibers may not diminish the uniformity of planar sheets formed on other papermaking machines which are more capable of handling long fibers (i.e. inclined wire papermaking machines).

Possible reinforcing fibers include, but are not limited to, carbon fibers such as polyacrylonitrile-based carbon fibers; FORTAFIL ® produced by Fortafil Fiber, Inc., of Rockwood, Tennessee, Thornel produced by Amoco Performance Products, Inc., of Ridgefield, Conn., RK produced by RK Carbon Fibres Limited of Cheshire, England, AS-4 produced by Hercules Advanced Materials and Systems Co., of Magna Utah, PANEX ® produced by Zoltek Corporation of St. Louis, Mo., mixtures thereof, and other conventional reinforcing fibers which are compatible with the fuel cell environment.

The concentration of reinforcing fibers in the final electrolyte reservoir plate is typically up to about 20 wt %, with up to about 10 wt % preferred, and about 2.5 wt % to about 7.5 wt % especially preferred. Even though the flexural strength of the resultant electrolyte reservoir plate is significantly increased by the addition of the reinforcing fibers, it is feasible to exclude the reinforcing fibers for the purpose of minimizing material costs. Electrolyte reservoir plates made without reinforcing fibers may limit the cell size (i.e. planform) because scrap rates increase substantially as the planform is increased on parts with low flexural strength.

Since the electrolyte reservoir plate is produced by forming planar sheets which are laminated together, cellulosic fibers are also mixed with the graphite powder and reinforcing fibers to provide sufficient wet-strength during the papermaking process such that the planar sheets are strong enough to traverse the entire papermaking machine without breaking. Typically, about 10 wt % to about 30 wt % cellulosic fibers are present in the final electrolyte reservoir plate, with about 15 wt % to about 27 wt % preferred. These fibers are preferably small enough to form a substantially uniform sheet while large enough to provide sufficient hydrogen bonding to impart wet strength during papermaking. Consequently, these fibers have fiber diameters of about 30 $\mu$ to about 45 $\mu$ and lengths of about 2 mm to about 4 mm. Cellulosic fibers include fibers derived from natural sources such as hardwoods, softwoods, cotton, and hemp or synthetic materials such as rayon, mixtures thereof, and others, with soft wood pulp preferred. Some such fibers include, but are not limited to Prince George, Northern, Semi-bleached Softwood Pulp, available from Canfor of Vancouver, British Columbia; Brunswick, Southern softwood pulp available from Georgia Pacific of Brunswick, Ga.; Columbus, Southern softwood pulp, available from weyerhaeuser, of Columbus, Miss., mixtures thereof, and other conventional cellulosic fibers.

The mixture of graphite powder, reinforcing fibers, and cellulosic fibers is bonded together with a thermosetting resin which, upon carbonization and graphitization, imparts sufficient structural integrity to the composite to hold the composite together during processing. Typically, thermosetting resins which yield about 40% carbon or greater upon carbonization will impart sufficient structural integrity to the composite post graphitization and provide electrical and thermal continuity between the graphite particles in the electrolyte reservoir plate. Resins with carbon yields below about 40% will likely produce graphitized electrolyte reservoir plate's having marginal strength; below about 1000 psi flexural strength. There is no known detrimental effect for incorporating higher carbon yield resins. The thermosetting resins include: phenolic resins, polyimides petroleum pitches, and furfuryl alcohols, with phenolic resins preferred. For example, PLENCO ™ phenolic resin produced by Plastics Engineering Company, Sheboygan, Wis., and OXYCHEM ™ phenolic resin produced by Oxychem, Durez Division, North Tonawanda, N.Y., mixtures thereof, and others. The concentration of thermosetting resin in the final electrolyte reservoir plate typically ranges from about 10 wt % to about 40 wt %, with about 25 wt % to about 35 wt % preferred. This thermoserring resin can be utilized either in the form of a powder preferably having particle sizes below about 20 $\mu$, or dispersed in a solvent such as water or an organic solvent such as methanol or ethanol.

Production of the electrolyte reservoir plate comprises forming the solid constituents, the graphite powder, reinforcing fibers, cellulosic fibers, and thermosetting resin, into a slurry using a liquid compatible with the solids. Generally, the liquid is water or a water based liquid. Sufficient liquid to substantially evenly distribute the solid constituents onto the screen of the papermaking machine upon which they are showered, is preferred. Typically, sufficient liquid corresponds to about 90 v/o (volume percent) liquid or greater with about 99 v/o liquid preferred.

The slurry is formed into a planar sheet at approximately 100 lineal feet per minute using a conventional papermaking machine. The slurry is showered substantially evenly onto the horizontal moving screen such that the solid constituents are retained on the screen while the liquid is allowed to pass through. The moving screen travels over a sufficient amount of vacuum sources, or other conventional means, which serve to further dry the retained solid constituents and to promote hydrogen bonding between the cellulosic fibers in the planar sheet. Once the planar sheet is sufficiently dry to support itself, it leaves the screen and travels over several rollers where it is additionally supported by felts running over the rollers. From the rollers the planar sheet travels over a series of heated drums, typically steam or oil heated drums, where residual moisture is volatilized. The dried planar sheet is then spooled onto cardboard tubes for collection. The resultant planar sheet is about 0.508 mm (millimeters; 0.02 inches) to about 1.5 mm (0.06 inches) thick and can be made at any width the particular papermaking machine is capable of forming.

Figure 2:
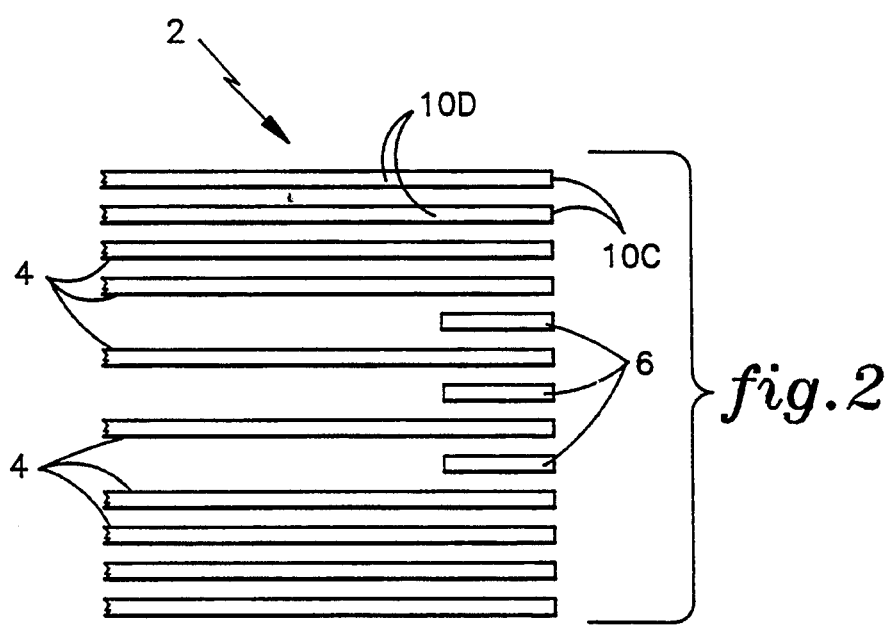
FIG. 2 is a frontal view of the lay-up shown in FIG. 1.

The planar sheet is dried at a temperature sufficient to dry the planar sheet without beginning to cure the thermosetting resin. Typically, the drying temperature ranges from about 200° F. (about 93° C.) to about 300° F. (about 149° C.), with about 225° F. (about 107° C.) to about 275° F. (about 135° C.) preferred. Once the planar sheet has been dried it is cut to the desired sizes of main sheets 4 and edge strips 6 and laminated. (see FIGS. 1 and 2) Generally, electrolyte reservoir plates, as with other fuel cell components, are about 89 cm (about 35 inches) by about 89 cm (35 inches) or about 114 cm (about 45 inches) by about 114 cm (about 45 inches).

Lamination comprises laying-up the main sheets 4 on top of one-another with additional edge strips disposed therebetween. The main sheets 4 have four edges, 10a, 10b, 10c, 10d. The perimeter of the main sheets 4 at two of the opposing edges 10a and 10c, are denser areas formed by the edge strips 6 to prevent gas flow through those two edges of the final electrolyte reservoir plate. The width of the edge strips 6 is dependent upon the specific area in which restriction of gas flow is desired, while the length of the edge strips 6 is typically substantially equivalent to the length of the edge of the main sheet where it is located, i.e. the length of 10c.

The lay-up may consist of virtually any number of main sheets 4 and edge strips 6 wherein the resultant electrolyte reservoir plate has sufficiently densified opposing edges 10a and 10c to prevent gas diffusion. The preferred ratio of edge strips to main sheets is about 0.25 to about 0.5. Higher ratios of edge strips result in very dense edges which would be thicker than the remaining areas of the sheets. This non-uniform thickness can cause stacking problems in the fuel cell and migration problems due to voids formed by the non-uniform electrolyte reservoir plates. Additionally, such very dense edges tend to blister during heat treat due to inadequate porosity to remove by-products of the curing process.

The lay-up 2 is laminated by placing it within a molding press and compressing to the desired thickness of about 1.27 mm (about 0.05 inches) to about 3.81 mm (about 0.15 inches) under an axial load of up to about 3,000 psig and a temperature of about 300° F. (about 150° C.) to about 450° F. (about 230° C.), with a temperature of about 325° F. (about 165° C.) to about 375° F. (about 190° C.) preferred for about 1 to about 15 minutes. The laminated lay-up is then carbonized by heating at about 8° F./hour to about 1,500° F. (about 815° C.) to about 2,000° F. (about 1,095° C.) and remaining at that temperature for about 0.5 hours to about 4 hours, and subsequently graphitized at about 3,632° F. (about 2,000° C.) to about 5,432° F. (about 3,000° C.) for about 2 hours to about 4 hours.

It should be noted that the planar sheets can be formed from the graphite powder, reinforcing fibers, and cellulosic fibers. In such a case, once the planar sheets have been formed and dried, they can be impregnated with the thermosetting resin.

The invention will be further clarified with reference to the following illustrative examples. These examples are meant to illustrate the process of forming the laminated electrolyte reservoir plate of the present invention. They are not, however, meant to limit the scope thereof.

Example I

The following process can be utilized to form a 40 wt % AirCo 60 graphite powder, 5 wt % FORTAFIL ⅛ inch unsized carbon fiber, 28 wt % OXYCHEM Phenolic resin, and 27 wt % Softwood Pulp.

1. Water is mixed with the solids in a portion of 0.4 g graphite powder, 0.05 g carbon fibers, 0.28 g OxyChem Phenolic Resin, and 0.27 g Softwood Pulp to form a slurry having about 1 v/o solids.
2. Once thoroughly blended, the slurry is showered onto a horizontally moving screen to form a planar sheet with a basis weight of 250 lb/ream or 12 oz/sq.yard.
3. The screen is passed over a vacuum to remove some of the remaining water, and thereby dry the planar sheet.
4. The dried planar sheet is then directed over rollers and oil heated drums to volatilize residual water and form the dried paper. The drums are heated to 250° F.
5. The dried paper is spooled on a cardboard tube for collection.
6. The spooled paper is cut into 10–35 inch by 35 inch sheets and 6–35 inch by 2.83 inch strips.
7. The sheets and strips are then laid up such that strips are laid on opposed edges of the sheets between sheets 4 and 5, 5 and 6, and 6 and 7.
8. The lay-up is then compression molded to 0.140 inches at 2370 psig for 5 minutes at 345° F. (about 175° C.) to laminate the lay-up.
9. The laminated lay-up is carbonized in a nitrogen environment up to 1510° F. (about 820° C.) at 8° F. per hour and subsequently graphitized at 4262° F. at 77° F./hour (2350° C. at 25° C./hour).

Example II

The following process can be employed to form an electrolyte reservoir plate having 40 wt % AirCo 60 graphite powder, 5 wt % Fortafil ⅛ inch unsized carbon fiber, 28 wt % OxyChem Phenolic resin, and 27 wt % Softwood Pulp.
1. A slurry is prepared and formed into paper as described in Example I steps 1–5.
2. The paper is cut into 10–45 inch by 45 inch sheets and 12–45 inch by 2.83 inch strips.
3. The sheets and strips are then laid up such that 2 strips are laid on opposed edges of the sheets between sheets 4 and 5, 5 and 6, and 6 and 7.
4. The lay-up is laminated in a compression mold to about 0.140 inches at 1430 psig for 5 minutes at 340° F. (about 170° C.).
5. The laminated lay-up is carbonized in a nitrogen environment at 1510° F. (about 820° C.) at 8° F. per hour and subsequently graphitized at 4262° F. at 77° F./hour (2350° C. at 25° C./hour).

There are numerous advantages realized by the electrolyte reservoir plate of the present invention. Due to the dense edge seals which are about 25% to about 50% more dense than the remainder of the electrolyte reservoir plate, impregnation of the edge seals with hydrophilic ink or similar material is not required. In addition to improved edge seals, the electrolyte reservoir plate has improved structural integrity due to the use of longer reinforcing fibers than prior art electrolyte reservoir plates. These improvements over the prior art are illustrated in the following Table which compares the prior art electrolyte reservoir plate (ERP) to the laminated ERP of the present invention.

| Physical Properties (Post Graphitization) | Prior Art ERP | Laminated ERP |
| --- | --- | --- |
| IR (mV/mil at 100 ASF) | 0.004 | 0.011 |
| Flexural Strength (psi) | 844 | 2461 |
| Flexural Modulus (psi × $10^{-6}$) | 0.254 | 0.67 |
| Compressive Strength (psi) | 221 | 317 |
| Compressive Modulus (psi) | 12356 | 9026 |
| Mean Pore Size ($\mu$) | 18.2 | 13.6 |
| Porosity (%) | 43.0 | 45.0 |

Although this invention has been shown and described with respect to detailed embodiments thereof, it will be understood by those skilled in the art that various changes in form and detail thereof may be made without departing from the spirit and scope of the claimed invention.

We claim:
1. A laminated electrolyte reservoir plate, comprising: a mixture of graphite powder, reinforcing fibers, cellulosic fibers, and thermosetting resin formed into a planar sheet, wherein said sheet has been cut into a plurality of main sheets having at least two opposing edges and a plurality of edge strips which have been laid-up such that said edge strips are located along the perimeter of said main sheet along said opposing edges, laminated together, carbonized, and graphitized.
2. A laminated electrolyte reservoir plate as in claim 1, wherein said reinforcing fibers are carbon fibers.
3. A laminated electrolyte reservoir plate as in claim 1, wherein said cellulosic fibers are derived from natural materials, synthetic materials, or mixtures thereof.
4. A laminated electrolyte reservoir plate as in claim 3, wherein said natural materials are hardwoods, softwoods, cotton, hemp, or mixtures thereof, and said synthetic material is rayon.
5. A laminated electrolyte reservoir plate as in claim 1, wherein said thermosetting resin is a phenolic resin, polyimide, petroleum pitch, furfuryl alcohol, or mixture thereof.
6. A laminated electrolyte reservoir plate as in claim 1 comprising about 25 wt % to about 60 wt % graphite powder.
7. A laminated electrolyte reservoir plate as in claim 1 comprising up to about 20 wt % reinforcing fibers.
8. A laminated electrolyte reservoir plate as in claim 1 comprising about 10 wt % to about 30 wt % cellulosic fibers.
9. A laminated electrolyte reservoir plate as in claim 1 comprising about 10 wt % to about 40 wt % thermosetting resin.

* * * * *